Oct. 10, 1939.                H. G. CUNNINGHAM ET AL                2,175,343
                        PLATE COOLER FOR STEREOPTICON SLIDES
                          Filed Sept. 24, 1937        2 Sheets-Sheet 1
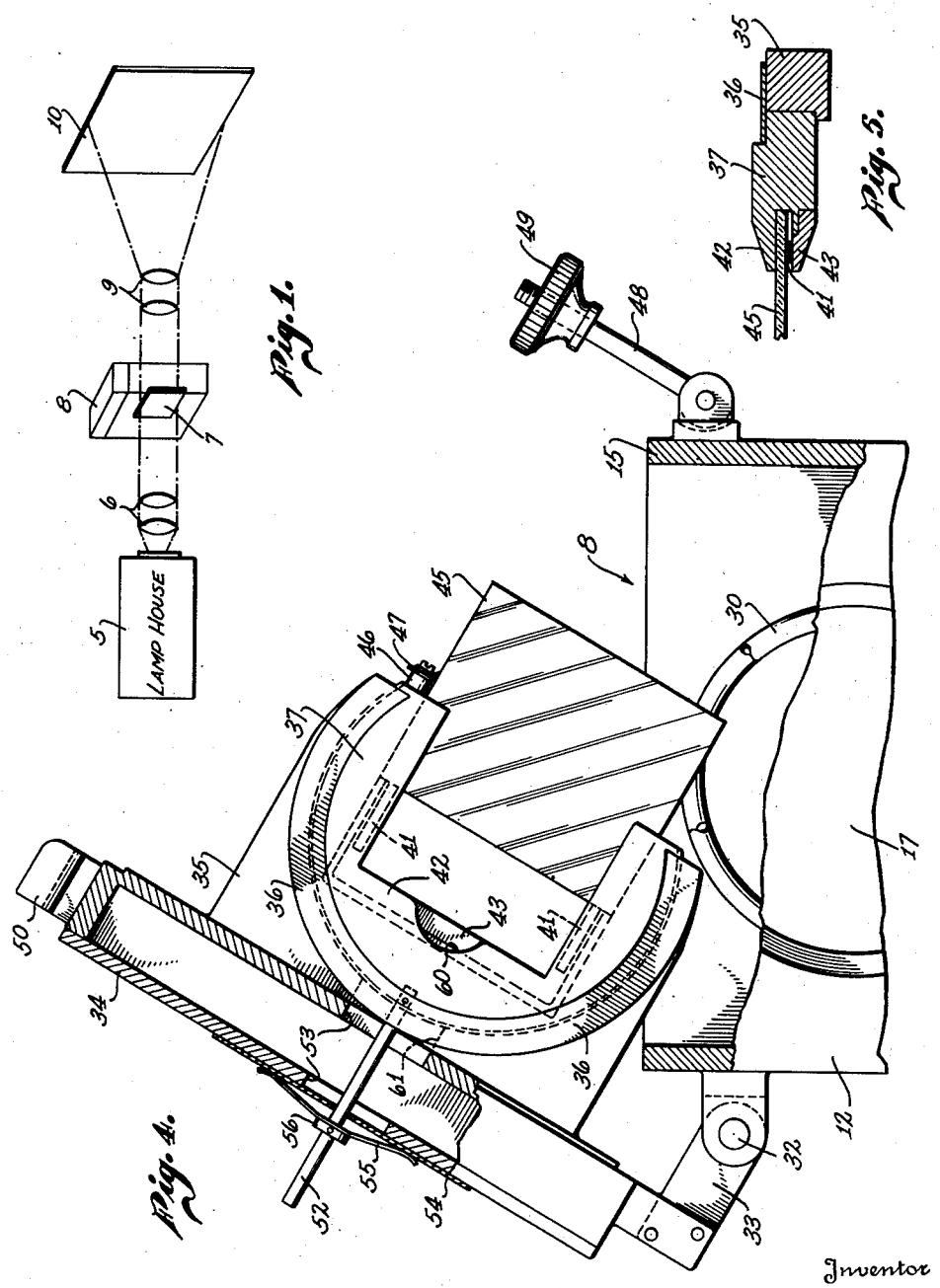
Inventor
Harry G. Cunningham
William F. Hanberry
By
ATTORNEY

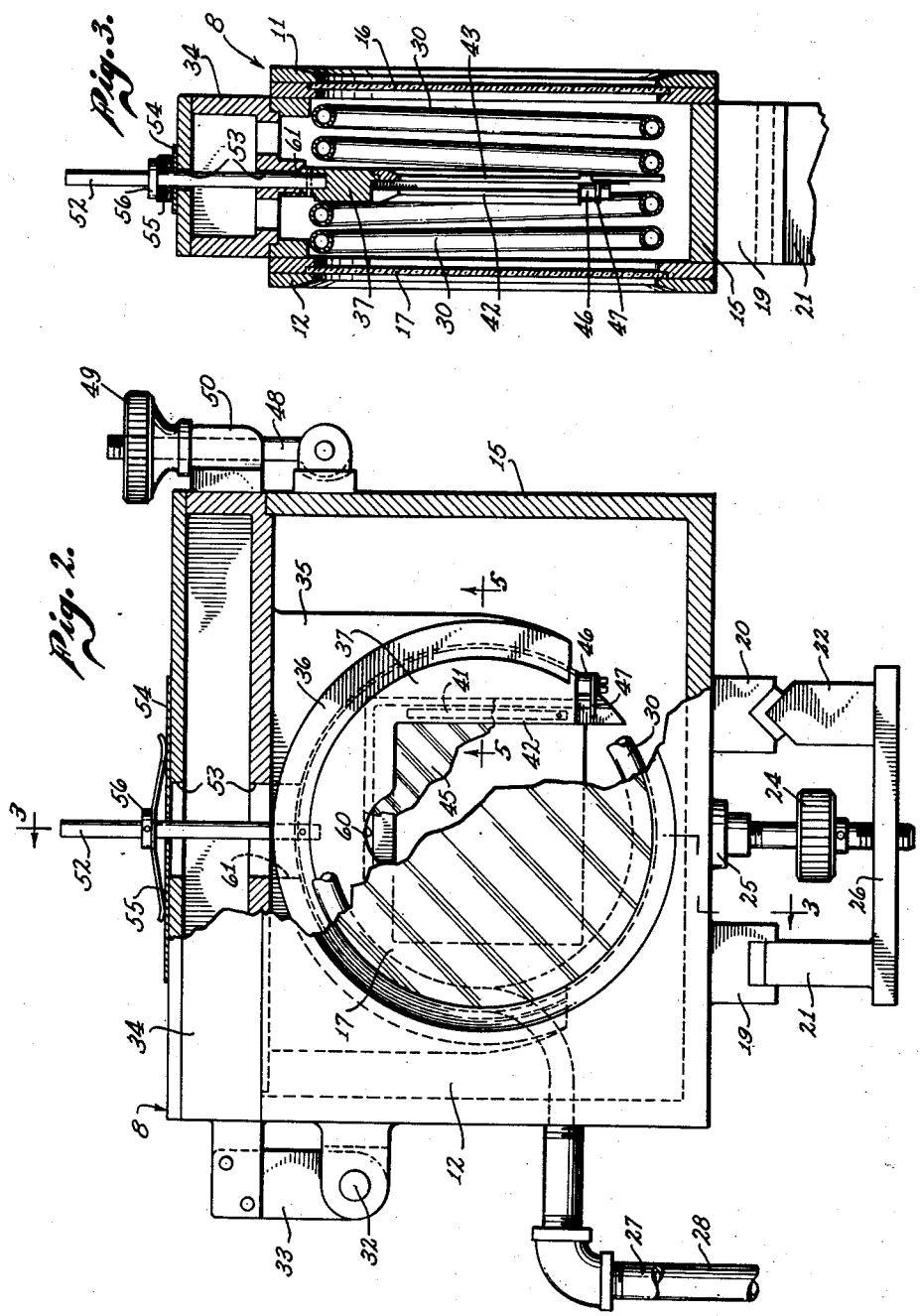

Patented Oct. 10, 1939

2,175,343

UNITED STATES PATENT OFFICE 2,175,343

PLATE COOLER FOR STEREOPTICON SLIDES

Harry G. Cunningham, Los Angeles, and William F. Hanberry, Hollywood, Calif., assignors to Radio Keith Orpheum Corporation, a corporation of Maryland Application September 24, 1937, Serial No. 165,516

6 Claims. (Cl. 88—26)

This invention relates to picture projection apparatus and particularly to a device for positioning and cooling stereopticon slides being projected upon a diffusing screen.

In the motion picture industry many methods are employed for obtaining pictures composed of several components taken at different times, known as process shots. Usually the background component of a final scene has been taken at some distant point, such as a foreign country, and at a time prior to the making of the final picture. For composition the background component was sent to a studio where the actors were located. This background component may have been either a motion picture of a "still" in the form of a stereopticon slide, the present invention being directed to the latter type. When using either still slides or motion pictures, they are projected upon a translucent screen, on the other side of which are positioned the actor or actors and a camera. The camera will photograph the actors, which form the foreground action, and the projected picture on the diffusing screen, which forms the background component to provide the composite scene which may be either a "still" or in motion.

In this type of photography considerable quantity of light is required to give the background component the proper illumination for effecting the negative in the photographing camera. This quantity of light produces considerable heat and when a stationary slide is employed, it is necessary that the slide be properly cooled during the projection thereof so as not to damage it.

The present invention has for its principal object, therefore, the provision of a slide holder which will permit the projection of a slide at the proper light intensities over long periods of time.

Another object of the invention is to provide a stereopticon slide holder for the projection of slides at high light intensities and in which the azimuth of the slide may be adjusted during projection.

A further object of the invention is to provide a cooling system for stereopticon slides which employs a transparent cooling medium in contact with the slide and which does not interfere with the projection of the slides and in which the temperature of the slide may be controlled by a second cooling medium.

Although the novel features which are believed to be characteristic of this invention will be pointed out with particularity in the claims appending herewith, the manner of its organization and the mode of its operation will be better understood by referring to the following description read in conjunction with the accompanying drawings forming a part thereof, in which:

Figure 1 is a diagrammatic view of a projection system in which the invention is employed, Figure 2 is a front elevational view of the holder of the invention in partial cross-section, Figure 3 is a cross-sectional view taken along the line 3—3 of Fig. 2, Figure 4 is a view showing the holder in partially open position with a slide partially inserted, and Figure 5 is a detailed view of the manner of inserting the slide in the holder and is a cross-sectional view along line 5—5 of Fig. 2.

Referring now to Fig. 1, a lighthouse 5 generates a light beam which is projected by lenses 6 upon a slide 7 within a holder 8, the emergent light from the slide being projected by lenses 9 upon a diffusing screen 10. This projection system is well known and the picture on the screen 10 may be either for the purpose of observation or for the purpose of rephotographing with a local foreground, as discussed above.

Referring now to the remaining figures showing the details of the holder 8 of Fig. 1, a frame 15, preferably of a light metallic material such as aluminum, is of a rectangular shape and is provided on either side thereof with circular transparent glass walls 16 and 17, the edges of which are inserted in grooves and clamped tightly so as to be leak-proof by members 11 and 12, respectively. This structure forms a container for a cooling medium.

The frame 15 is mounted upon two dependent extensions 19 and 20, extension 19 being rectangular to accommodate a runner 21, and extension 20 being triangular to accommodate a runner 22, these runners being similar to those of an optical bench. A knurled thumb screw 24 threaded in a boss 25 of frame 15 and in a crossbar 26 is employed to tighten the slide holder in any adjusted position on the runners.

Entering the frame 15, as shown in Fig. 2, are inlet and outlet pipes 27 and 28 which conduct any desired cooling liquid, such as water, into a continuous spiral coil 30, shown in cross-section in Fig. 3. The coil 30 comprises four sections which are disposed in pairs toward the front and back of the holder. The pipes 27 and 28 may be connected to a water supply with a control valve for introducing any quantity of water dependent upon the heat transfer required.

The upper or cover portion 34 of the holder is hinged at 32 on an extension 33 at one end thereof. Cover 34 has a depending flange 35 which extends into the interior of the holder between the coil pairs 30 when the cover is closed. The depending flange 35 has a circular track in which is a rotatable member 37 having a straight-sided notch or opening therein, the member 37 being held in position by a circular plate 36, as shown in Fig. 5. The member 37 has a pair of jaws 42 and 43, jaw 43 having a flat spring 41 attached thereto, the spring 41 lying between the two jaws 42 and 43. The spring 41 is for the purpose of holding a slide 45 tightly between the jaws 42 and 43, the slide 45 being shown in Fig. 4 as partially inserted. The bottom portion of the member 37 has an extension 46 thereon with a lock lever 47 which may be swung into the same plane as the member 37 for the purpose of locking the slide is position when the cover is in place. A cut-away portion 60 serves to aid in the removal of the slide 45. To insert or exchange a slide, the cover 34 is raised, as shown in Fig. 4. When closed, the cover is held in place by a threaded rod 48 and thumb nut 49, the rod fitting into a slotted extension 50 at the end of the cover.

For purposes of adjusting the azimuth of the slide after it is positioned within the holder, a rod 52 is connected at one end to the rotatable member 37 through slots 53 of the cover and an aligned elongated slot 61 in flange 35. A dust cover 54, held in place by a spring 55 and a collar 56, is shown positioned over the openings 53. Since the track of flange 35 is more than 180° and circular and the member 37 mounted therein, any movement of the rod handle 52 will rotate the member 37 and thereby shift the slide 45 so that its azimuth may be adjusted with respect to the optical system or the diffusing screen 10.

The cooling action for the slide is obtained through the action of any suitable transparent fluid, such as cosmetic oil, sufficient oil being placed in the holder to immerse the slide 45 and coils 30. As the light beam heats the slide, this heat is transferred to the oil by conduction, which will circulate thermo-dynamically within the holder. The heat of the oil is then similarly transferred to the coils and to a cooler fluid, such as water, flowing therein, and is thus carried away. A certain amount of heat is also absorbed by the oil but this is also dissipated in the same manner. The rate of heat exchange is controllable by the amount of water flowing through the coils 30 and the temperature thereof so that any desired constant temperature for the slide may be obtained. It is to be noted that the coils do not interfere with projection of the slide, as the device is, of course, designed to accommodate slides of an area within that enclosed by the cooling coils 30.

We claim as our invention:

1. A holder comprising a frame having an opening at the upper end thereof, transparent side-walls in optical alignment in said frame, a cover for said opening having a depending flange, said flange having a circular grooved opening therein, a member supported in the groove of said flange and rotatable therein, runways on opposite sides of said member for inserting a slide therein and maintaining said slide at approximately the center of said frame and in optical alignment with said transparent side-walls, a transparent fluid within said frame immersing said slide, and means immersed in said first fluid for conducting a second fluid into and out of said frame.

2. A holder comprising a rectangular frame open at the top, transparent side-walls in optical alignment in said frame, a transparent fluid in said frame, a plurality of coils immersed in said fluid and having inlet and outlet connections to the exterior of said frame for conducting a second fluid through said transparent fluid, a slide immersed in said transparent fluid and in optical alignment with said transparent side-walls, said slide and said coils lying in substantially parallel planes, a cover for said frame having a depending flange, and means on said flange for rotatably supporting said slide.

3. A holder for stereopticon slides comprising a rectangular frame having transparent sides in optical alignment and adapted to contain a transparent fluid through which a light beam is adapted to be projected, a plurality of coils adapted to encircle said beam within said fluid and having inlet and outlet connections through said frame, a cover for said frame, means depending from said cover and having a circular grooved aperture, means attached to said depending means by said groove for supporting a stereopticon slide, said means being rotatable in said groove, and means extending through an aperture in said cover for rotating said last-mentioned means.

4. A stereopticon slide holder comprising a rectangular container having transparent side-walls through which a light beam may be projected, a slide in said container, a plurality of spiral coils within said container and disposed around said beam, the plane of said coils lying substantially parallel to the plane of said slide, a hinged cover member having a depending flange with a circular inner opening, the inner edges of said opening having a circular grooved track, a carrying member for said slide supported in said grooved track and rotatable therein, a lever attached to said last-mentioned member extending through an aperture in said cover, movement of said lever rotating said member, said member having an opening with runways at opposite sides thereof for holding said slide therein, and means for fastening said cover in position on said container, said slide being held at approximately the center of said container among said coils whereby said light beam passes through said container and through said slide.

5. A holder for stereopticon slides comprising a frame member, opposite transparent side-walls in optical alignment in said frame member, a cover member on said frame, a slide holder supported on said cover member for positioning a slide in said frame in optical alignment with said transparent side-walls and parallel thereto, means on said slide holder for rotating said slide in a plane parallel to its face, means including tubular cooling coils in said frame encircling a projection beam passing through said slide and transparent side-walls, a transparent fluid in said frame immersing said slide in said cooling coils, and a second cooling fluid in said cooling coils whereby said slide is cooled in said projection beam.

6. A stereopticon slide holder comprising a container having transparent side-walls in optical alignment through which a light beam may be projected, a slide in said container, a plurality of spiral coils within said container and disposed around said beam, the plane of said coils lying substantially parallel to the plane of said slide, a cover member having a depending flange, the inner edges thereof having a circular grooved track, a slide carrying member supported in said grooved track and rotatable therein, and means extending through an aperture in said cover for rotating said member and said slide, said slide being positioned at approximately the center of said container among said coils whereby said projection beam passes through said transparent side-walls and said slide.

HARRY G. CUNNINGHAM.
WILLIAM F. HANBERRY.